United States Patent
Khouzam et al.

(10) Patent No.: US 8,640,097 B2
(45) Date of Patent: Jan. 28, 2014

(54) HOSTED APPLICATION PLATFORM WITH EXTENSIBLE MEDIA FORMAT

(75) Inventors: Gilles Khouzam, Redmond, WA (US); Sam J. George, Redmond, WA (US); Brian J. Ewanchuk, Redmond, WA (US); Lawrence W. Olson, Redmond, WA (US); Michael R. Harsh, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 499 days.

(21) Appl. No.: 12/405,208

(22) Filed: Mar. 16, 2009

(65) Prior Publication Data

US 2010/0235820 A1 Sep. 16, 2010

(51) Int. Cl.
- *G06F 9/44* (2006.01)
- *G06F 9/45* (2006.01)
- *G06F 9/445* (2006.01)

(52) U.S. Cl.
USPC ............ 717/121; 717/107; 717/148; 717/178

(58) Field of Classification Search
None
See application file for complete search history.

(56) References Cited

U.S. PATENT DOCUMENTS

| | | | |
|---|---|---|---|
| 6,216,152 B1 * | 4/2001 | Wong et al. | 709/203 |
| 6,225,993 B1 * | 5/2001 | Lindblad et al. | 715/716 |
| 7,358,434 B2 | 4/2008 | Plastina et al. | |
| 7,587,712 B2 * | 9/2009 | Mountain et al. | 717/148 |
| 8,079,029 B2 * | 12/2011 | Sakoh et al. | 717/178 |
| 2002/0083432 A1 * | 6/2002 | Souissi et al. | 717/178 |
| 2003/0195851 A1 * | 10/2003 | Ong | 705/50 |
| 2004/0225994 A1 | 11/2004 | Wason et al. | |
| 2005/0058319 A1 | 3/2005 | Rhoads et al. | |
| 2005/0289510 A1 * | 12/2005 | Illowsky et al. | 717/107 |
| 2005/0289527 A1 * | 12/2005 | Illowsky et al. | 717/148 |
| 2006/0232449 A1 * | 10/2006 | Jain et al. | 341/50 |
| 2007/0016703 A1 | 1/2007 | Bozionek et al. | |
| 2007/0043550 A1 | 2/2007 | Tzruya | |
| 2007/0260615 A1 * | 11/2007 | Shen | 707/100 |
| 2007/0260616 A1 | 11/2007 | Shen | |
| 2007/0268362 A1 * | 11/2007 | West et al. | 348/14.15 |
| 2007/0283167 A1 | 12/2007 | Venters et al. | |

(Continued)

FOREIGN PATENT DOCUMENTS

| | | |
|---|---|---|
| CN | 1965281 A | 5/2007 |
| EP | 0 911 728 A1 | 4/1999 |
| EP | 1 605 460 A1 | 12/2005 |
| WO | 2008066958 A1 | 6/2008 |

OTHER PUBLICATIONS

L. Chen, Dances with multimedia: embedded video codec design, Oct. 2006, 1 page.*

(Continued)

*Primary Examiner* — Thuy Dao

(57) ABSTRACT

A media interaction system is described herein that allows hosted applications to consume and/or produce rich media content independent of the format of the media content, while still maintaining the security of the host. The media interaction system accepts raw, uncompressed media data from a hosted application, and allows the hosted application to provide its own codec through a sandboxed API that restricts the actions the codec can perform to a set of trusted actions. Then, the application provides the uncompressed data to the system for playback. Thus, the media interaction system provides rich media content in any format that the application developer supports, and maintains the security of the user's computer system.

13 Claims, 6 Drawing Sheets

(56) References Cited

U.S. PATENT DOCUMENTS

| | | | |
|---|---|---|---|
| 2008/0005653 A1* | 1/2008 | Swaminathan et al. | 715/500.1 |
| 2008/0005801 A1 | 1/2008 | Abdo et al. | |
| 2008/0065393 A1 | 3/2008 | Kincaid | |
| 2008/0133938 A1 | 6/2008 | Kocher et al. | |
| 2008/0320439 A1* | 12/2008 | Son et al. | 717/107 |
| 2010/0192127 A1* | 7/2010 | Son et al. | 717/121 |
| 2012/0167044 A1* | 6/2012 | Fortier et al. | 717/121 |
| 2013/0205277 A1* | 8/2013 | Seven et al. | 717/121 |

OTHER PUBLICATIONS

Huang et al., A workload prediction model for decoding mpeg video and its application to workload-scalable transcoding, Sep. 2007, 10 pages.*

Sanigepalli et al., A modified video codec for MBMS applications, Dec. 2005, 8 pages.*

Alcazar Mark, "Windows Presentation Foundation Security Sandbox", retrieved at<<http://msdn.microsoft.com/en-us/library/aa480229.aspx>>, Sep. 2005, pp. 1-10.

"Introduction to the Digital Media Libraries", retrieved at<<http://hal.chem.uwm.edu/library/SGI_bookshelves/SGI_Developer/books/DMediaDev_PG/sgi_html/ch01.html, Jan. 29, 2009, pp. 1-5.

"BlackMagic Multibridge Eclipse", retrieved at<<http://www.newmedia.com.au/BlackMagic-Multibridge-Eclipse-pr-2484.html>>, Jan. 29, 2009, pp. 1-4.

"J D C T E C H T I P S", retrieved at<<http://java.sun.com/developer/TechTips/txtarchive/2002/Feb02_JohnZ.txt, Sep. 2005, Feb. 19, 2002, pp. 1-8.

"Gridcasting", retrieved at<<http://www.octoshape.com/press/pdf/0612/id061204_nab.pdf>>, Dec. 4, 2006, pp. 2.

"Adobe AIR 1.5 HTML Security", retrieved at<<http://help.adobe.com/en_US/AIR/1.5/air_html_security/air_html_security, pp. 10.

"International Search Report", Mailed Date: Sep. 27, 2010, Application No. PCT/US2010/026702, Filed Date: Mar. 9, 2010, pp. 13.

China Office Action, Mailed Date: Jul. 20, 2012, Application No. 201080012732.2, Filed Date: Mar. 9, 2010, pp. 9.

Extended European Search Report, Mailed Date: Jul. 26, 2012, Application No. 10 753 883.7, Filed date: Mar. 9, 2010, pp. 8, Munich.

Just-in-time compilation, URL:http://en.wikipedia.org/w/index.php?title=Just-in-time compilation&oldid=276154029; Published: Mar. 10, 2009.

* cited by examiner

HOSTED APPLICATION PLATFORM WITH EXTENSIBLE MEDIA FORMAT

BACKGROUND

Contemporary browsers and other applications allow plug-ins, which in general comprise hosted software code that interacts with the hosting browser/application to provide additional functionality. One reason for using plug-ins is to increase security, because the hosting browser limits the actions that the hosted code (which is generally untrusted) can perform. The Internet has become very dangerous, with malicious websites often attempting to cause a user to download and run harmful code that may damage the user's computer system or destroy the user's data. Thus, web browsers often include restrictions on the code that can run, and the plug-ins that are allowed to perform actions on the user's computer system. Plug-ins increase the size of the sandbox provided by the browser, because they allow more functionality on the web while decreasing the number of untrusted applications installed. One such plug-in is Microsoft® Silverlight™, which provides a platform that allows application developers to create rich web applications hosted in the browser that typically include animation, vector graphics, and/or media (e.g., audio/video) content playback. Another example plug-in is Adobe® Flash™.

In general, to play media a platform provides Application Programming Interfaces (APIs) that hosted application code calls to specify a location that stores specific media content, e.g., by specifying a Uniform Resource Locator (URL) that identifies a file or other container on a server that packages the media content. The platform then spawns network requests to start downloading the media. The platform parses the media content by unpacking it to extract the media content streams to provide them to a media pipeline for playback. Microsoft® Silverlight™, like other platforms, provides functionality to playback video and audio in a variety of formats (WMV (Windows Media Video), WMA (Windows Media Audio), MP3, H.264, AAC (Advanced Audio Coding)) by allowing an application to download or stream a file containing combinations of the supported formats. The types of audio and video formats that are allowed are not extensible and performing a conversion into one of the supported formats is resource intensive.

Unfortunately, as noted above, such platforms are typically limited to playing media content that is in one or more known formats anticipated by the platform designers. For example, the platform may include compressors and decompressors (codecs) for specific media types, such as Motion Picture Experts Group Version 4 (MPEG4 or MP4), DIVX, or other formats. Rapid evolution is common for codecs as new algorithms are discovered for further compressing media content and new scenarios are identified for conveying additional information associated with media content. Thus, over time a platform may come to support media formats that are out of date and are no longer popular or the most efficient. Platform updates are typically the only way of adding support for new media formats.

In addition, the platform designers have to perform extra work to implement support for each media format, which can make the platform implementation large and can slow the progress of adding new support for new media types to the platform. Some codecs are proprietary so that the platform designers cannot add support for media types that use the codecs without licensing the codecs from the codec provider, if at all. One reason that platforms often exert control over which codecs applications can use with the platform is to ensure security. Codecs often interact closely with computer system hardware to display video and playback audio, and can perform actions that are harmful to a user's computer system. Current systems trade broader media type support for security. Moreover, download speed is an often scrutinized metric for plug-ins, and as the platform size increases, the download speed decreases. Thus, platform designers may have an incentive to support fewer media formats to keep platform size small.

SUMMARY

A media interaction system is described herein that allows hosted applications to consume and/or produce rich media content independent of the format of the media content, while still maintaining the security of the host. The media interaction system accepts raw, uncompressed media data from a hosted application, and allows the hosted application to provide its own codec through a sandboxed API (application programming interface) that restricts the actions the codec can perform to a set of trusted actions. The media interaction system invokes an application provided to the system. The application runs and downloads compressed media data from a server or may create media data on the fly. The media interaction system provides a sandbox in which the application can run decompression code securely, and the application provides code to convert the compressed media data to uncompressed data for playback. Then, the application provides the uncompressed data to the system for playback. Thus, the media interaction system provides rich media content in any format that the application developer supports, and maintains the security of the user's computer system.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

A media interaction system is described herein that allows hosted applications to consume and/or produce rich media content independent of the format of the media content, while still maintaining the security of the host. The media interaction system accepts raw, uncompressed media data from a hosted application, and allows the hosted application to provide its own codec through a sandboxed API that restricts the actions the codec can perform to a set of trusted actions. The media interaction system invokes an application provided to the system. For example, a web page may include an embedded reference to the system and parameters specifying the application. The application runs and downloads compressed media data from a server or may create media data on the fly. For example, the application may download a video from an Internet-based content server or synthesize new video based on local information (e.g., an audio visualization based on the beats in an audio file). The media interaction system provides a sandbox in which the application can run decompression code securely, and the application provides code to convert the compressed media data to uncompressed data for playback. Then, the application provides the uncompressed data to the system for playback. Thus, the media interaction system provides rich media content in any format that the application developer supports, and maintains the security of the user's computer system.

Raw media data can refer to a number of types of media data that are typically uncompressed, common formats that are ready for a media pipeline to play without further decompression or similar processing. For example, a video decoder may output raw YV12 frames or an audio decoder may output PCM (pulse code modulation) samples. Media content can arrive to a hosted application in a variety of compressed or otherwise encoded formats (e.g., MP4 or DIVX), be decompressed by the hosted application, and then provided to the media interaction system in a common format that is ready for playback. Updates for new media types can occur by updating the application without updates to the platform. Applications may also produce audio and video data either by direct composition or by processing existing audio and video data (e.g., applying effects) to produce raw media data. For example, a game may produce sound effects "on the fly" to avoid sending and receiving sound data over the Internet. As another example, an application may receive video filmed in front of a green screen and process the video to remove the green background and insert a different background dynamically. In some applications, the platform may receive compressed video data in a format that the platform supports and uncompressed audio data or vice versa. These types of scenarios are difficult or impossible on existing platforms, but are easily supported by the media interaction system.

Figure 1:
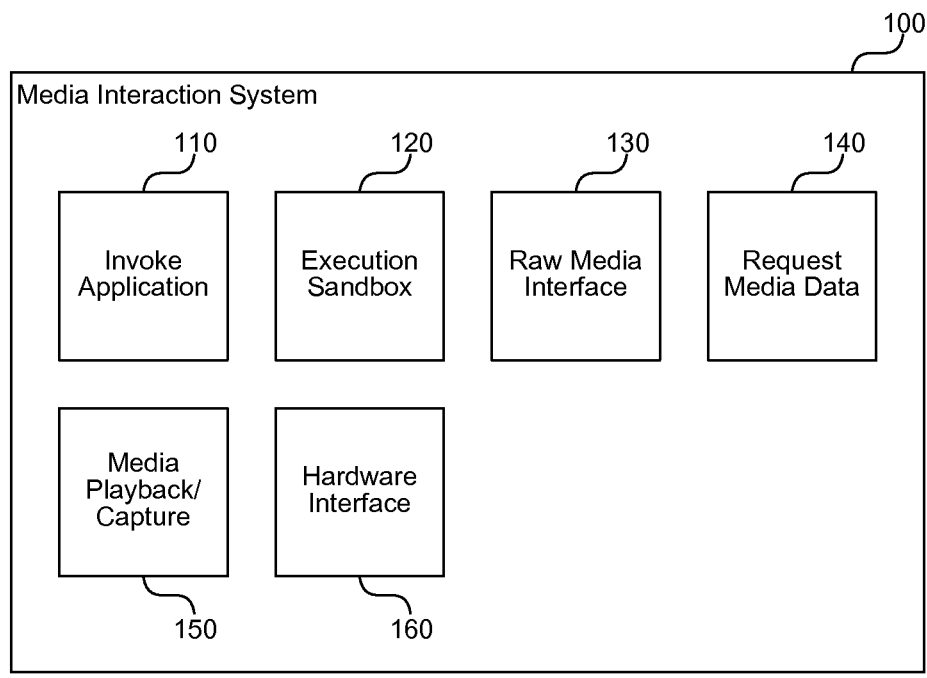
FIG. 1 is a block diagram that illustrates components of the media interaction system, in one embodiment.

FIG. 1 is a block diagram that illustrates components of the media interaction system, in one embodiment. The media interaction system 100 includes an invoke application component 110, an execution sandbox component 120, a raw media interface component 130, a request media data component 140, a media playback component 150, and a hardware interface component 160.

The invoke application component 110 loads and invokes application code within the platform. For example, a web page may reference an object that represents the platform and may include one or more parameters that specify the application that the platform will invoke. The invoke application component may download the application like other web-based content, e.g., from a server over a network, such as the Internet. For example, Microsoft® Silverlight™ receives application code in a package (e.g., a XAP file) with other data (e.g., dependency modules, media files, application parameters, and so forth) useful for running the application. A web browser, such as Microsoft® Internet Explorer™, invokes Microsoft® Silverlight™, and Microsoft® Silverlight™ invokes the application.

The execution sandbox component 120 provides an execution environment for application code that limits the actions that the application can perform. For example, the environment may limit the hardware resources, user data, or other information that the application can access. Because the execution sandbox component 120 runs application code in a secure sandbox, users can trust that the code cannot do malicious things that arbitrary code not running in a sandbox could do. Using the execution sandbox component 120, an application can implement or invoke codecs for processing media types not natively supported by the application platform. Unlike codecs that run using native code, sandboxed codecs invoked by an application are unable to harm the user's computer system. The execution sandbox may include a limited instruction set or libraries that application code can execute, and may include Just in Time (JIT) compilation of application code to executable object code so that the system 100 can manage the actions that the application code can perform. The execution sandbox may also provide a secure way for the application to call operating system APIs to perform various functions (e.g., accessing files, connecting to remote servers, accessing configuration settings, and so forth).

The raw media interface component 130 provides an API through which applications can provide the application platform with raw, uncompressed media content that the platform can play. Unlike previous platforms that receive compressed media content from applications and then use codecs internal to the platform to decompress the media content to an uncompressed format, the media interaction system 100 allows applications to decompress the media content from any number of formats before passing the uncompressed media content to the application platform for playback. In this way, the application platform does not limit support for new media formats, but rather supports any format that an application can decompress and provide to the platform. In addition, the decompression occurs only once, rather than a potential workaround to previous platforms where an application could decompress one media format and then compress the media content into a second media format supported by the platform. Note that this workaround adds a further decompression step within the platform in order to play the media content back.

The request media data component 140 optionally calls into the application to receive media data. Those of ordinary skill in the art will recognize that software designers frequently make a choice between a push model in which a component is regularly provided with data and a pull model in which the component polls for new data. The media interaction system 100 may receive data periodically from applications for playback through the media pipeline, or the system 100 may control playback and periodically ask the application for the next slice of media data (e.g., a video frame or audio sample) for playback. The system 100 uses the request media data component 140 when the system 100 controls playback and requests media data from the application (see, e.g., the GetSampleAsync API described further herein).

The media playback component 150 renders media using the hardware interface component 160 and the received uncompressed media content. The media playback component 150 may include multiple steps for preparing and playing back the media content, sometimes referred to as a media pipeline. For example, the media playback component 150 may include synchronization logic for aligning and playing back audio samples with associated video frames in an audiovisual display. The media playback component 150 may also include the ability to capture new media data (e.g., through hardware such as a microphone or other source), and may provide uncompressed media data to applications through the raw media interface component 130 so that applications can compress the media data into a particular application-supported format.

The hardware interface component 160 interacts with computer hardware to playback and/or capture media data. The hardware interface component 160 may also provide user interface controls for controlling the system 100. For example, the hardware interface may provide access to one or more speakers, displays, input devices, and so forth. The hardware interface component 160 may allow the user to pause, seek, and playback media data through one or more user interface controls (e.g., on-screen buttons or keyboard shortcuts). By isolating applications from the computer system hardware, the system 100 prevents applications from performing unauthorized actions and from harming the computer system.

The computing device on which the system is implemented may include a central processing unit, memory, input devices (e.g., keyboard and pointing devices), output devices (e.g., display devices), and storage devices (e.g., disk drives or other non-volatile storage media). The memory and storage devices are computer-readable storage media that may be encoded with computer-executable instructions (e.g., software) that implement or enable the system. In addition, the data structures and message structures may be stored or transmitted via a data transmission medium, such as a signal on a communication link. Various communication links may be used, such as the Internet, a local area network, a wide area network, a point-to-point dial-up connection, a cell phone network, and so on.

Embodiments of the system may be implemented in various operating environments that include personal computers, server computers, handheld or laptop devices, multiprocessor systems, microprocessor-based systems, programmable consumer electronics, digital cameras, network PCs, minicomputers, mainframe computers, distributed computing environments that include any of the above systems or devices, and so on. The computer systems may be cell phones, personal digital assistants, smart phones, personal computers, programmable consumer electronics, digital cameras, and so on.

The system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

Figure 2:
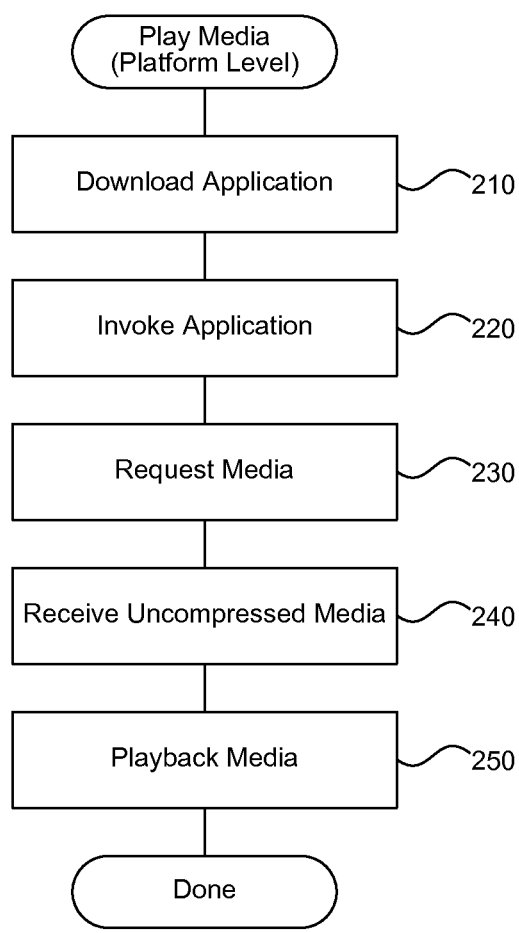
FIG. 2 is a flow diagram that illustrates the processing of the system at the platform level to play media, in one embodiment.

FIG. 2 is a flow diagram that illustrates the processing of the system at the platform level to play media, in one embodiment. In block 210, the platform downloads the application. For example, the application may be contained within a compressed container (e.g., a XAP file) stored on a server on the Internet. The platform receives a reference that indicates where to find the application when the platform is invoked. For example, if the platform is used on a website, then a web page may contain a reference to the platform with an indication of an application for the platform to run. Continuing in block 220, the platform invokes the downloaded application. For example, the platform may decompress any a container that packages the application (e.g., a software module) and its dependencies (e.g., other modules), and then call an initialization function provided by the application. The application may do many things in response (see FIG. 3), such as accessing a network to retrieve media content.

Continuing in block 230, the platform requests media from the application. For example, the platform may periodically call an agreed upon media retrieving interface to receive a set of video frames or audio samples from the application for playback. In some embodiments, the application may instead invoke the platform as media is available rather than the platform making the media request. Continuing in block 240, the platform receives uncompressed media from the application. The application may obtain the media in a variety of ways, including downloading compressed media from the network and decompressing the media using an application-provided codec, creating the media using common media synthesis techniques, or modifying existing media (e.g., by applying one or more post-processing effects). Regardless of the origin of the media, the application provides the media to the platform in a format understood by the platform that the platform can playback without further decompression of the media. By placing responsibility for extracting and decompressing the media on the application, the platform allows the application to use any container and media compression format that the application author desires.

Continuing in block 250, the platform sends the uncompressed media through a media playback pipeline for playback using available hardware. For example, the media pipeline may use an operating system API (e.g., Microsoft® DirectX™) to playback audio samples using speakers or to render video frames to a display. After block 250, these steps conclude.

Figure 3:
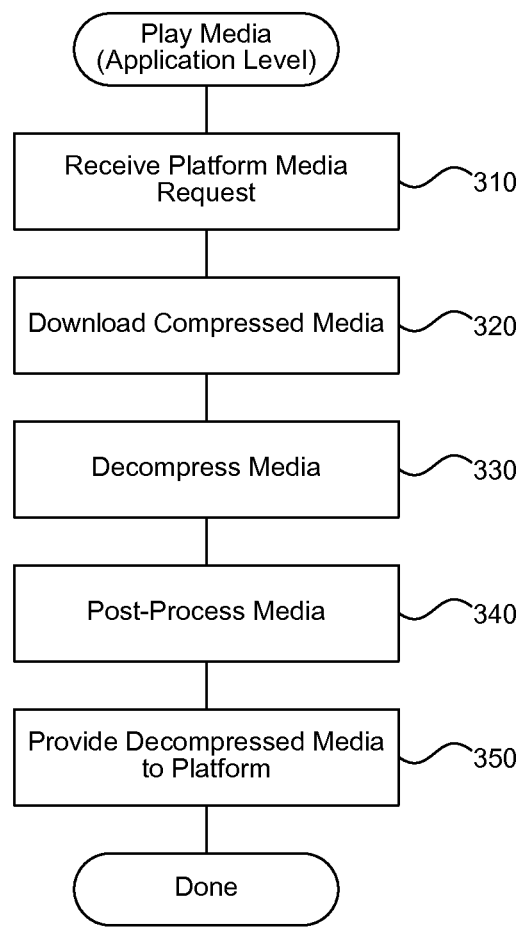
FIG. 3 is a flow diagram that illustrates the processing of the system at the application level to play media, in one embodiment.

FIG. 3 is a flow diagram that illustrates the processing of the system at the application level to play media, in one embodiment. In block 310, the application receives a media request from the platform. For example, the platform may invoke a predefined interface that the application implements for providing media data. Continuing in block 320, the application downloads compressed media, such as from a network server. For example, the application may be configured to receive media content from a web server that provides media content in a compressed format, such as MP4. Alternatively or additionally, the application may create media content programmatically, such as by synthesizing a series of musical notes or piecing together separate media files.

Continuing in block 330, the application decompresses the compressed media. For example, the application may invoke a codec that decompresses media data for a particular format of the compressed media. The application may include the codec or may download the codec from a network server. The codec, like the application, runs in an execution sandbox provided by the platform that limits the actions that the codec can perform to protect the user's computer system from malicious or defective code. Because the application is responsible for decompressing media, applications can support new media types by including codecs in their own application code without a platform update. Thus, applications can support new formats quickly without waiting on the platform developer to add new media support.

Continuing in block 340, the application optionally applies post-processing effects to the decompressed media. In traditional systems where the platform performs decompression, it is not possible for applications to apply post-processing effects to media. Post-processing effects can include a wide array of media modifications, including modifying the background of a video, adding a video overlay (e.g., closed caption text), adding audio echo, and so forth. The application may also be able to save resources by including fewer media assets since the application may reuse similar assets with post-processing to eliminate other assets. For example, an application that includes a video with five backgrounds would traditionally download five different videos and provide the appropriate video to the platform for decompression. Using the media interaction system, the application could instead include one video with a replaceable background (e.g., a green screen), and then provide smaller-sized images for inserting as each of the five backgrounds during post-processing. The application may also use post-processing to insert advertisements or other information into the media stream.

Continuing in block 350, the application provides the decompressed media to the platform for playback. The application may provide the media in chunks based on platform requests, or may provide a link to a larger stream or file containing uncompressed media for the platform to playback. After block 350, these steps conclude.

In some embodiments, the media interaction system provides a hardware interface through which applications can directly render media without a media pipeline. For example, the system may provide a writeable bitmap region through which an application can write data directly to the screen. The media pipeline provides synchronization of audio and video. However, for applications that render only video or perform their own form of synchronization, this type of direct access is useful for more efficiently processing media content.

In some embodiments, the media interaction system provides an extensibility interface through which applications can add support for additional codecs to the platform through a plug-in model. Rather than decode/decompress compressed media data directly, the application may invoke an installed codec plug-in and passed compressed data either through the platform to the codec, or directly to the codec.

In some embodiments, the media interaction system provides applications with access to advanced hardware support for decompressing audio and video data. For example, many modern processors support instructions for performing vector math and other common multimedia operations. One example is the SSE2 instruction set. SSE is a two-level acronym, where SSE stands for Streaming SIMD Extensions and SIMD stands for Single Instruction, Multiple Data. The execution sandbox can allow applications to use such instructions, either explicitly or by JIT compiling application code in a way that produces executable code that uses these instructions. As another example, the media interaction system may provide access to pixel or vertex shaders provided by a Graphics Processing Unit (GPU), by allowing applications to provide shader logic or JIT compiling executable shader code.

In some embodiments, the media interaction system supports encoding in a similar manner to decoding. The system captures media through hardware or other input (e.g., a software-emulated device) and provides the media in an uncompressed format to an application. The application selects and uses its own codec to compress the media data into an application-specific format. The application may then upload the media to a server or perform other steps relevant to the application. The system may also use the plug-in model described herein to allow applications to register new encoding codecs that the system can use to provide an application with media content in a format selected by the application.

In some embodiments, the media interaction system allows applications to post-process decompressed media content before providing the media content to the system for playback. For example, applications can add effects, such as echo, to audio, or modify video by changing the playback speed, correcting colors, overlaying a logo, and so forth. Applications can also use post-processing to provide an equalizer or audio visualization to the user.

Various aspects of the technology described herein are generally directed towards decoupling media content decompression from media stream processing and playback. In general, hosted application code performs the downloading, unpacking, and decompression operations rather than the platform. As a result, applications can support new and/or proprietary media formats, such as provided by third parties, developed out-of-band with the platform, e.g., independent code may unpack and decompress WMV and WMA media streams from their own, possibly custom container formats, and inject those streams for playback. As another result, the media data may come from any source or sources, via any protocols and/or transport mechanisms. At the same time, security is maintained through a specific set of platform APIs that control the actions that the hosted code can perform.

In some embodiments, the media interaction system provides an application environment running in a browser plug-in with an interface to allow untrusted application-level code to provide data in the form of elementary video, audio, and script streams for playback by the application environment. The data may come from any source and may be packaged in any format, including formats that previous application environments are not able to process. Note that as used herein, "application-level code" refers to code that communicates through API calls to at least one lower-level platform component, regardless of any actual level.

Although many of the examples herein are described with reference to media content played in a browser/Microsoft® Silverlight™ environment, it is understood that these are only examples. As can be readily appreciated, other hosting programs and/or environments may use the technology described herein. As such, the media interaction system is not limited to any particular embodiments, aspects, concepts, structures, functionalities, or examples described herein. Rather, any of the embodiments, aspects, concepts, structures, functionalities or examples described herein are non-limiting, and the system may be used in various ways that provide assist in computing and content processing in general.

Figure 4:
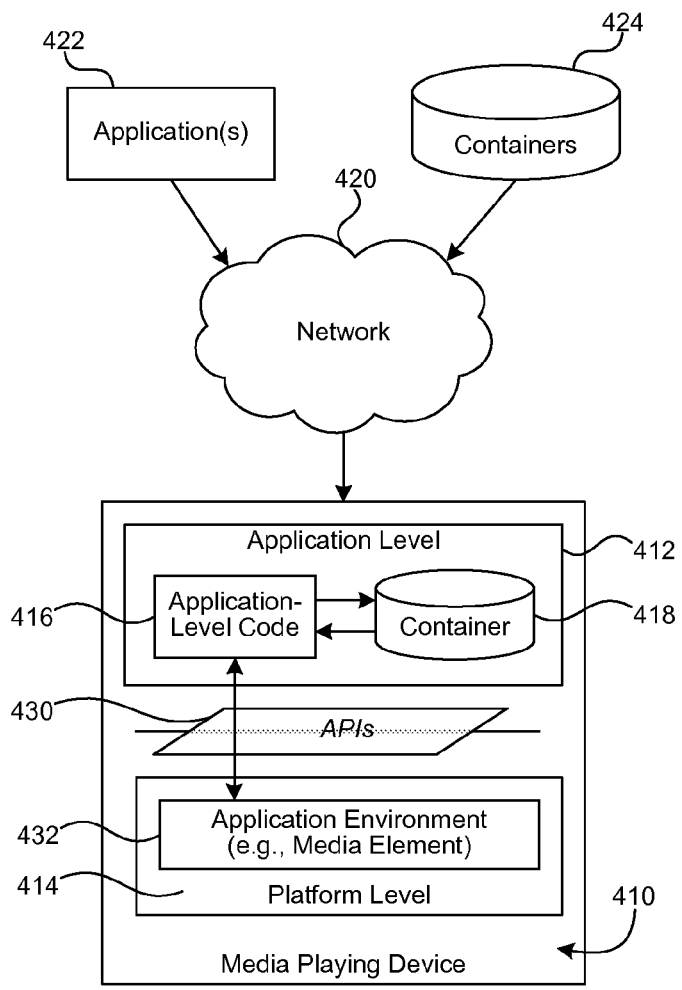
FIG. 4 is a block diagram that illustrates an operating environment of the media interaction system, in one embodiment.

FIG. 4 is a block diagram that illustrates an operating environment of the media interaction system, in one embodiment. There is shown a media-playing device 410 such as a personal computer system arranged with an application level 412 and a platform level 414. Other examples of media playing devices include a mobile telephone or other digital device. Application-level code 416 such as a web application or other code is hosted in the application level 412, and as described below, processes (e.g., unpacks, extracts, decompresses, and delivers) content from a container 418. The application-level code 416 may be any hosted code such as a browser plug-in downloaded via any network 420, such as the Internet, as represented by the set of available applications 422. The applications 422 may be any type of executable code, including script or other human readable code that is interpreted, or compiled binary or intermediate code that may be executed directly or otherwise executed (e.g., through JIT compilation). Note with respect to containers, one container option is "no container" or just raw audio (e.g., PCM samples) or video, in which event the application may process the content for playback, e.g., decrypt it, break it into samples, and so forth.

Because the application-level code 416 processes the container's content, the content may be in any format that the application-level code 416 understands, allowing a custom application and/or container, for example, to be hosted and have its content used in some way, e.g., played back as media. This includes known containers/packages/formats, proprietary formats, extensions to existing packages/formats, and future container packages/formats not yet developed.

Further, the application-level code 416 may download a container such as the container 418 from among a set of containers 424 using any suitable protocol or protocols over any suitable network transport, e.g., Sockets/HTTP. This allows the content provider significant flexibility, e.g., content may be distributed among servers, including for redundancy, load balancing, security, and so forth. For example, a single piece of content may exist in different formats, in different packages, be separated into different parts, have different security requirements, and so forth. An application can download the different packages and merge them as needed (or select one based upon conditions) for providing the content for playback.

A container may comprise many different types of data. While in a typical example the data may correspond to various media, such as audio, video, or image media, any data type may be stored in a container. Further, a container may have two or more different sets of data, such as separate audio, video, and still image data sets, and/or distribute each type of supported data using different containers. Some containers may be relatively complex and may contain multiple types of data. Note that because Silverlight™ code can be factored into code libraries, different libraries for downloading and unpacking different formats can be created, reused, and shared. This provides a way to share any different, new packaging and container formats that are developed over time.

Code such as the exemplified application-level code 416 hosted in the application level 412 communicates with the platform level 414 through a set of APIs 430. For example, the application-level code makes API calls to an application environment 432 (corresponding to a media element) to provide media content for playback, as well as to perform other media-related operations such as seek, pause, stop and so forth. In general, regardless of the container format, the platform level 414 stays unchanged and independent of any particular application.

The application-level code 416 may also communicate with the application environment for other reasons, such as to inform the application-level code when a license for decrypting protected media (e.g., video, audio and script stream data) is required, as well as to enable the application-level code to provide the application environment with the license data, e.g., for decrypting the streams. In this manner, digital rights management (DRM) may be handled internally, not by an external DRM provider, e.g., DRM License requests may not bubble back through managed web requests or web client APIs. A DRM initialization vector provides data about the sample that for decrypting the sample. However, note that the flexibility of the API allows other rights management systems to be used in conjunction with the system. As one example, content may be encrypted over the network and then decrypted before passing it through the MediaStreamSource described herein.

The application environment 432 may be a plug-in or other type of environment that uses a browser as a user interface. The browser may be a web browser, such as an operating system component, for example, and may serve as a display and human interface mechanism for application-level code (e.g., application level code 416) that may execute in conjunction with the application environment. The application environment may plug into the browser. As a plug in, the browser may invoke the application environment 432 when the browser detects an application such as the application-level code 416 to execute. For example, a video element may be created in a web page displayed by a browser. The application-level code 416 may perform various actions to retrieve, process, prepare, and cause the platform to display the video element. The user may be able to manipulate controls within the user interface to pause the video, seek the video to a certain point, and perform other operations based on the user input.

Figure 5:
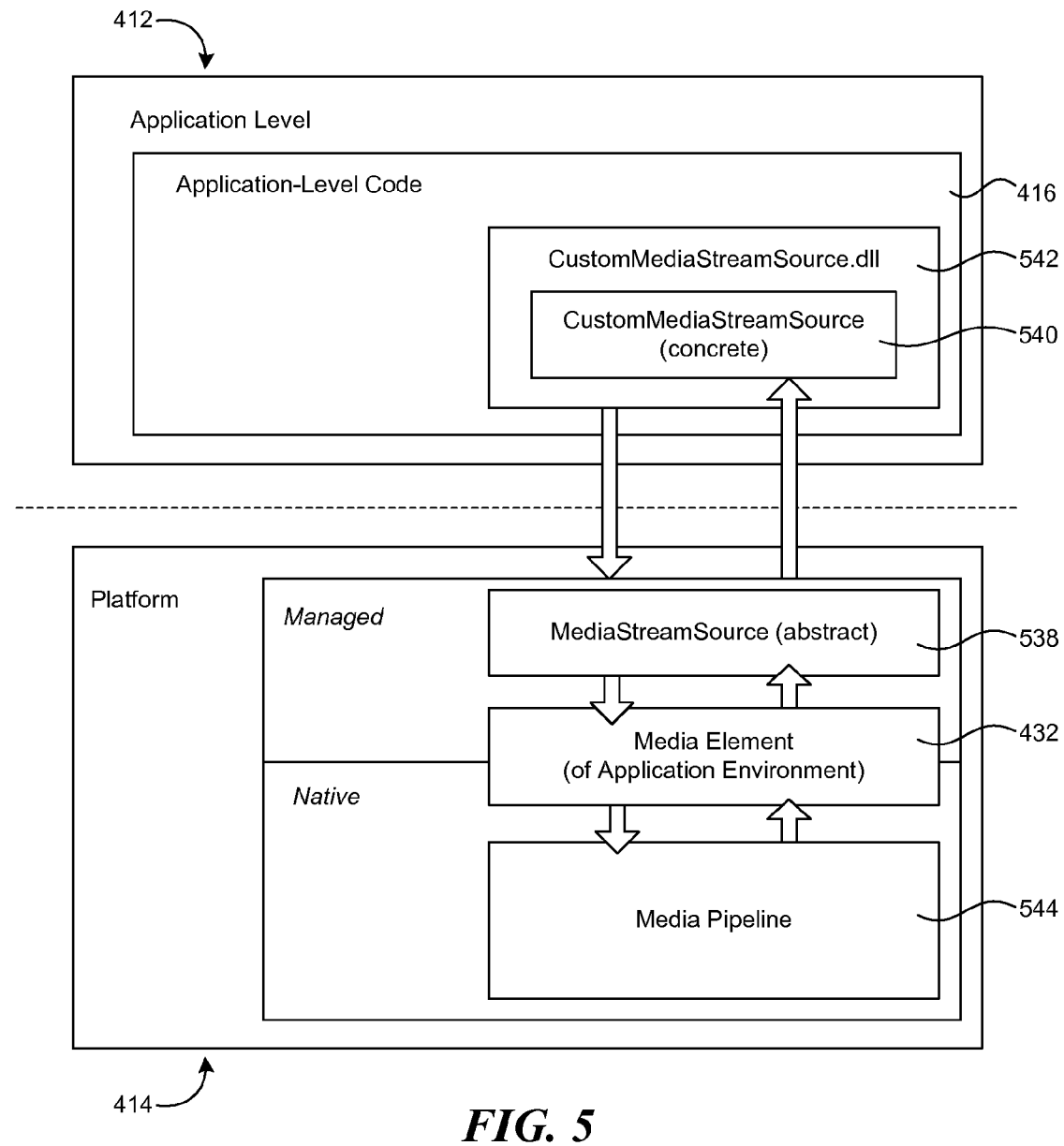
FIG. 5 is a block diagram that illustrates a more particular example, in which the application-level code derives from an abstract type, in one embodiment.

FIG. 5 is a block diagram that illustrates a more particular example, in which the application-level code derives from an abstract type, in one embodiment. The application-level code 416 derives from the abstract type MediaStreamSource 538, to get a concrete implementation (object instance), referred to herein as a CustomMediaStreamSource 540. In this example, which represents a typical implementation, the concrete CustomMediaStreamSource 540 is provided in a separate assembly that the application-level code 416 includes, shown herein as a dynamic link library (DLL) CustomMediaStreamSource.dll, or simply DLL 542. As described below, the concrete CustomMediaStreamSource 540 receives requests for elementary media streams and diagnostics from the media element, and the DLL 542 provides responses comprising elementary media streams and diagnostics. With those responses, the media element takes appropriate actions, including providing media streams to a media pipeline 544 for playback.

Figure 6:
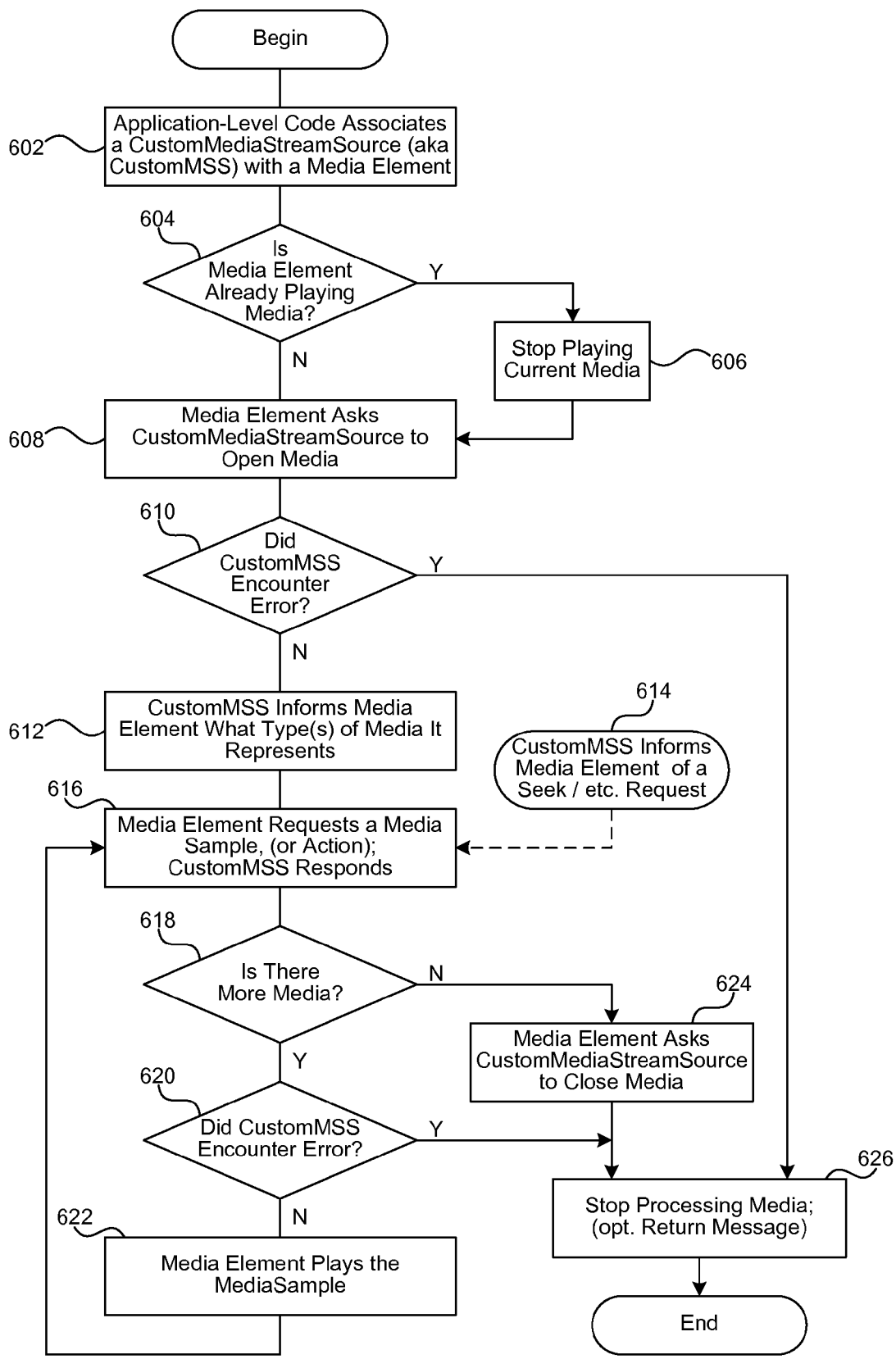
FIG. 6 is a flow diagram that illustrates playback steps corresponding to the example of FIG. 5, in one embodiment.

FIG. 6 is a flow diagram that illustrates playback steps corresponding to the example of FIG. 5, in one embodiment. Block 602 represents the application-level code 416 associating a MediaStreamSource with the media element. For example, the application may call a set source method, pointing a source property to the URI of a container, and pass a reference to the concrete CustomMediaStreamSource 540 implementation. This action starts a conversation between the media element and the concrete CustomMediaStreamSource 540.

The media element checks whether it is currently playing media, and if so, stops that playback as represented by block 606. In any event, in block 608 the media element asks the CustomMediaStreamSource 540 to open its media. If at block 610 there is an error encountered by the CustomMediaStreamSource (MSS), e.g., the media did not open, was corrupt, and so forth, in block 610 the processing stops, and, for example, the CustomMediaStreamSource 540 can optionally provide a message or the like to report the problem to the media element, as well as to the application such as to notify the user of a problem.

In the event that there is not a problem, in block 612 the CustomMediaStreamSource 540 informs the media element what type or types of media it Represents, e.g., WMA, WMV, MP3, or RAW. As represented by block 616, the media element then starts requesting samples. If media is available at block 618, and there is no error (block 620), the media element plays the media sample in block 622, e.g., injects it into the media pipeline 544, such as into a pipeline playback buffer. The process then continues until no more media is available, that is, the media is exhausted, at which time block 618 will branch to block 624 where the media element asks the CustomMediaStreamSource 540 to close the media. In the event an error occurred during the sample playback loop, block 620 exits the playback loop so that media processing stops, with an optional message (block 626) as described above.

Another possibility, generally represented by block 614, is that the CustomMediaStreamSource 540 requests another playback operation, such as seek, pause, stop, and so forth. As represented in block 616, the media element responds by requesting that the CustomMediaStreamSource 540 take the action, as appropriate. Note that with such a mechanism, the platform level thus remains in control of the various aspects of the playback operation. The application level is responsible for processing the container content, including unpacking, extracting, decompressing, selecting a sample, and providing the content to the platform.

EXAMPLE API

The following shows an example API suitable for implementing the processing described herein.

```
namespace System.Windows.Media
{
  public abstract class MediaStreamSource
  {
    public MediaStreamSource( ){ }
    protected abstract void OpenMediaAsync( );
    protected void ReportOpenMediaCompleted( IEnumerable<
      MediaStreamDescription> availableMediaStreams, IDictionary<
      MediaSourceAttributesKeys, string> mediaSourceAttributes);
    protected abstract void SeekAsync(Int64 seekToTime);
    protected void ReportSeekCompleted(Int64 timeSeekedTo) { }
    protected abstract void GetSampleAsync( MediaStreamType
      mediaStreamType );
    protected void ReportGetSampleCompleted( MediaStreamSample
      mediaSampleDescription ) { }
    protected void ReportGetSampleProgress(double
      bufferingProgress ) { }
    protected abstract void SwitchMediaStreamAsync(
      MediaStreamDescription mediaStreamDescription );
    protected void ReportSwitchMediaStreamCompleted(
      MediaStreamDescription mediaStreamDescription) { }
    protected abstract void GetDiagnosticAsync(
      MediaStreamSourceDiagnosticKind diagnosticKind);
    protected void ReportGetDiagnosticCompleted(
      MediaStreamSourceDiagnosticKind diagnosticKind, double
      diagnosticValue) { }
    protected abstract void CloseMedia( );
    protected void ErrorOccurred( string errorDescription ) { }
  }
  public class MediaElement
  {
    public int AudioStreamIndex { get; set; }
    public void SetSource(MediaStreamSource mediaSource) { }
  }
  public enum MediaStreamSourceDiagnosticKind
  {
    DownloadProgressAsPercent
  }
  public class MediaStreamDescription
  {
    public MediaStreamDescription(MediaStreamType streamType,
      IDictionary<MediaStreamAttributeKeys, string>
      mediaStreamAttributes) { }
    public MediaStreamType MediaStreamType { get; }
    public IDictionary<MediaStreamAttributeKeys, string>
      MediaStreamAttributes { get; }
  }
  public class MediaStreamSample
  {
    public MediaStreamSample (Stream stream, MediaStreamDescription
      mediaStreamDescription, Int64 offset, Int64 count, Int64
      timestamp, IDictionary< MediaSampleAttributeKeys, string>
      MediaSampleAttributes) { }
    public Stream Stream { get; }
    public MediaStreamDescription MediaStreamDescription { get; }
    public Int64 Offset { get; }
    public Int64 Count { get; }
    public IDictionary< MediaSampleAttributeKeys, string>
      MediaSampleAttributes { get; }
    public Int64 Timestamp { get; }
  }
  public enum MediaStreamType
  {
    Audio,
    Video,
  }
```

```
  public enum MediaStreamAttributeKeys
  {
    FourCC, // Accepts YV12 and RGBA raw media types
    CodecPrivateData,
    Width,
    Height
  }
  public enum MediaSampleAttributeKeys
  {
    KeyFrameFlag,
    DRMInitializationVector,
    BufferWidth, // For raw media types
    BufferHeight // For raw media types
  }
  public enum MediaSourceAttributesKeys
  {
    CanSeek,
    Duration,
    DRMHeader
  }
}
```

The following is an example use of the APIs above within an application to provide a raw media sample:

```
// code used inside a MediaStreamSource
IDictionary<MediaStreamAttributeKeys, string> sampleAttributes =
    new Dictionary<MediaStreamAttributeKeys, string>( );
sampleAttributes.Add(MediaSampleAttributeKeys.BufferWidth, "10");
sampleAttributes.Add(MediaSampleAttributeKeys.BufferHeight, "10");
MediaStreamSample rawSample =
    new MediaStreamSample(msd, rawVideoFrame, 0,
    rawVideoFrame.Length, 0, sampleAttributes);
this.ReportSampleCompleted (rawSample);
```

The MediaStreamAttributeKeys.FourCC attribute accepts types YV12 for raw uncompressed video and RGBA for raw color information (Red, Green, Blue, and Alpha). The MediaSampleAttributeKeys accepts values for the buffer width and height to describe to the platform the actual width and height of the sample buffer that the application is passing to the platform for playback.

The YV12 structure can be thought of as an array containing 3 color planes where the sample size inside each plane is 8 bits with the Y plane having the size (X, Y) and being followed by a U plane of size (X/2, Y/2) which is followed by a V plane of size (X/2, Y/2). For example, imagine a 10×10 image:

```
byte[ ] yv12Sample = new byte[150]; // Total size
byte[ ] yPlane = new byte[100]; // X * Y
byte[ ] uPlane = new byte[25]; // X/2 * Y/2
byte[ ] vPlane = new byte[25]; // X/2 * Y/2
// Copy ( SourceArray, SourceIndex, DestinationArray, DesintationIndex,
// Size)
// Planes are back to back
Array.Copy(yv12Sample, 0, yPlane, 0, 100); //Y 0 to 100 bytes
Array.Copy(yv12Sample, 100, uPlane, 0, 25); //U 100 to 125 bytes
Array.Copy(yv12Sample, 125, vPlane, 0, 25); //V 125 to 150 bytes
// From the MediaStreamSource API. Samples are actually in streams,
// not arrays.
MemoryStream yv12SampleStream = new MemoryStream(yv12Sample);
```

An RGBA sample can be thought of as an array containing 4-byte samples where each sample contains four 1-byte channels in the order Alpha, Red, Green, and Blue. For the same 10×10 image above:

```
byte[ ] argbSample = new byte[400]; // Total size
// In ARGB format, channels are interleaved (contrast with YV12 where
// channels Y,U, and V are separate).
for (long i = 0; i < argbSample.Length; i++ )
{
  switch (i % 4)
  {
    case 0: // Alpha
      argbSample[i];
      break;
    case 1: // Red
      argbSample[i];
      break;
    case 2: // Green
      argbSample[i];
      break;
    case 3: // Blue
      argbSample[i];
      break;
    default:
      break;
  }
}
```

Raw audio (e.g., a PCM sample) is expressed as a WaveFormatEx structure that is serialized to a hex string and passed to a MediaStreamSource using the CodecPrivateData attribute defined above. A PCM audio sample is represented as a stream of bytes. The runtime will take bytes singly, in the case of 8-bit samples, or in pairs, in the case of 16-bit samples. Example WaveFormatEx values are as follows:

```
FormatTag: 1
Channels: {1, 2}
SamplesPerSec: {8k, 11.025k, 12k, 16k, 22.05k, 24k, 32k, 33.075k, 40k,
  44.1k, 48k, 55.125k, 56k, 60k, 64k, 66.15k, 72k, 77.175k, 80k, 84k,
  88k, 88.2k. 96k}
AverageBytesPerSec: SamplesPerSec * BlockAlign
BlockAlign: Channels * BitsPerSample / 8
BitsPerSample: { 8 , 16}
Size: 0 // if nonzero, custom wave data follows the structure
```

EXAMPLE API-BASED IMPLEMENTATION

As described above, there is provided an abstract base class with which the media element 432 negotiates, such as to obtain elementary media streams (e.g., WMV, WMA, MP3, and RAW) and diagnostics. Application developers provide concrete implementations of that abstract base class (e.g., the CustomMediaStreamSource 540 is a concrete example of the MediaStreamSource 538 abstract base class).

Via the APIs 430, the application-level code 416 instances a concrete CustomMediaStreamSource 540 and associates it with a media element 432 by calling a method on media element 432, which in this example is MediaElement.SetSource (MediaStreamSource). After that call, normal media pipeline requests for elementary media streams are routed out to the concrete CustomMediaStreamSource 540. Through exposed APIs, such as set forth above, the CustomMediaStreamSource 540 provides the media pipeline with these elementary media streams, as well as any diagnostics information that the media element 432 uses.

In this example, with respect to a media element 432 having a MediaStreamSource set on it, when a media element 432 and a CustomMediaStreamSource 540 have been created, the application 416 calls MediaElement.SetSource with the new MediaStreamSource. The media element 432 then causes the MediaStreamSource OpenMediaAsync event to be raised.

A MediaStreamSource, such as the CustomMediaStreamSource 540, is disposed of and recreated as needed after closure. Closure occurs if the media element 432 has its Source property set to a new source, if the media element 432 has SetSource (null) called on it and its Source property is also null, or if an error occurred. Note that in this example implementation, an exception is thrown if an attempt is made to set Media element 432 to an already closed MediaStreamSource.

When the media element 432 opens and the MediaStreamSource represents a Broadcast, the media element 432 causes the MediaStreamSource OpenMediaAsync event to be raised. The CustomMediaStreamSource 540 collects its audio and video streams, providing MediaStreamDescriptions for each stream. The CustomMediaStreamSource 540 makes a new mediaSourceAttributes collection with Duration set to zero (0), and CanSeek set to false. The CustomMediaStreamSource 540 calls ReportMediaCompleted (media streams, attributes).

In an example implementation, when the media element 432 opens and the CustomMediaStreamSource 540 represents "On Demand" content, the media element 432 causes the MediaStreamSource OpenMediaAsync event to be raised. The CustomMediaStreamSource 540 collects its audio and video streams, making MediaStreamDescriptions for each stream. The CustomMediaStreamSource 540 makes a new mediaSourceAttributes collection with Duration set to the duration and CanSeek set to true. The CustomMediaStreamSource 540 calls ReportMediaCompleted (media streams, attributes).

The CustomMediaStreamSource 540 may correspond to multiple bit-rate streams. Note that in one example implementation, for MultipleBitRate implementers, a recommendation is to only expose one audio and one video stream (through ReportMediaCompleted) that declares the highest allowed bit rate, and pass samples of different bitrates as needed in ReportGetSampleCompleted. For example, content may be encoded multiple times, with different bit rates, each corresponding to a container cut from a file into URI-addressable chunks. The client and/or server may alter which chunks it downloads based on conditions, e.g., network load, client load, server load, and so forth, such as to provide different video quality/resolution based upon load conditions rather than pausing playback.

When the CustomMediaStreamSource 540 corresponds to multiple audio streams, the media element 432 causes the MediaStreamSource OpenMediaAsync event to be raised. The CustomMediaStreamSource 540 collects its audio stream and video stream, making MediaStreamDescriptions for each stream. The CustomMediaStreamSource 540 calls ReportMediaCompleted (audio streams, and video MediaStreamDescriptions).

Note that the MediaStreamSource may contain multiple video streams, e.g., developers can attempt to switch between multiple video streams, although results are not guaranteed in one implementation. To facilitate script commands and markers, in one implementation, developers use the media element 432's TimelineMarkers collection.

When the media element 432 has Stop called on it, in one typical example, the media element 432 stops raising MediaStreamSource GetSampleAsync (media type) events. Application developers use the media element's CurrentStateChanged event and CurrentState property in conjunction with a CustomMediaStreamSource 540 to implement this. Library developers may expose a method for an application developer to hook up the CurrentState changes from the media element 432 with the application's CustomMediaStreamSource Stop logic.

When the media element 432 has Pause called on it, in one typical example, the media element 432 stops raising MediaStreamSource GetSampleAsync (media type) events. To obtain a notification of state change, application developers use a media element's CurrentStateChanged event and CurrentState property in conjunction with a CustomMediaStreamSource. Library developers may expose a method for an application developer to hook up the CurrentState changes from the media element 132 with their MediaStreamSource Pause logic.

When resuming from a paused state, by calling Play on the media element 432, e.g., a video player application causes MediaElement.Play to be called, the media element 432 starts raising MediaStreamSource GetSampleAsync (media type) events. When resuming from a Stopped state, a video player causes MediaElement.Play to be called, and the media element 432 raises a MediaStreamSource SeekAsync (beginning of stream) event. The CustomMediaStreamSource 540 calls ReportSeekCompleted (very near to the beginning of stream), and the media element 432 starts raising MediaStreamSource GetSampleAsync (media type) events.

With respect to seeks, for a normal seek, the video player application sets MediaElement.Position. In response, the media element 432 causes MediaStreamSource.SeekAsync (new position as 100 ns ticks) to be raised. CustomMediaStreamSource 540 adjusts its streams to the nearest sample to the new location. The CustomMediaStreamSource 540 calls ReportSeekCompleted (position of the nearest sample in 100 ns ticks). The media element 432 causes MediaStreamSource.GetSampleAsync (new position as 100 ns ticks) to be raised. The CustomMediaStreamSource 540 returns the requested sample in MediaStreamSource.ReportGetSampleCompleted.

For a Seek to the end of the stream, a video player application sets MediaElement.Position, and the media element 432 causes MediaStreamSource.SeekAsync (new position as 100 ns ticks) to be raised. The CustomMediaStreamSource 540 adjusts its streams to the nearest sample to the new location. The CustomMediaStreamSource 540 calls ReportSeekCompleted (position of the nearest sample in 100 ns ticks). The media element 432 causes MediaStreamSource.GetSampleAsync (new position as 100 ns ticks) to be raised. The CustomMediaStreamSource 540 returns ReportGetSampleCompleted (null).

When the media element 432 enters an error state, e.g., the media element 432 hits an error from which it cannot recover, the media element 432 causes MediaStreamSource.CloseAsync to be raised. The CustomMediaStreamSource 540 disposes of its internal state as needed, and disassociates itself from the CustomMediaStreamSource 540 by internally setting its Source to null. The CustomMediaStreamSource 540 transitions into the closed state.

When the media element 432 switches audio streams, e.g., for a scenario such as having multiple language tracks, the media player causes MediaElement.AudioStreamIndex to be set. The media element 432 causes MediaStreamSource.SwtichMediaStreamAsync (stream to switch to). The CustomMediaStreamSource 540 switches the stream, adjusts the offset on the new stream to the right time, and starts buffering if needed. The CustomMediaStreamSource 540 calls ReportSwitchMediaStreamCompleted (stream switched to).

Whenever the CustomMediaStreamSource 540 cannot complete a media element request or has an error outside of a media element request from which it cannot recover, the CustomMediaStreamSource 540 enters an error state and informs the media element 432 by calling ErrorOccurred. If the CustomMediaStreamSource 540 has an unrecoverable internal error, the CustomMediaStreamSource 540 calls ErrorOccurred (description of error). In response, the media element 432 receives a message and starts an internal shutdown, raises a MediaFailed event with the description of the error, and causes CloseMediaAsync to be raised. The media element 432 further disposes of any structures, cleans up, and disassociates itself from the CustomMediaStreamSource 540 by setting its internal source to null.

With respect to MediaStreamSource buffering, the media element 432 requests a sample by causing GetSampleAsync to be raised. The CustomMediaStreamSource 540 does not have the required sample and enters buffering (assuming the buffer is completely empty). The CustomMediaStreamSource 540 attempts to gather the sample from the media file and reports that it is buffering with ReportGetSampleProgress (0). After some amount of time, the media element 432 enters a buffering state, whereby the CustomMediaStreamSource 540 will eventually fill some portion (e.g., half) of its buffer. Assuming half filled, the CustomMediaStreamSource 540 calls ReportGetSampleProgress (0.5). After some more time, the CustomMediaStreamSource 540 has filled the buffer to 90% and calls ReportGetSampleProgress (0.9). After some additional time, the CustomMediaStreamSource 540 has filled the buffer completely and returns a sample by calling ReportGetSampleCompleted (next sample). Sometime after receiving the sample, the media element 432 transitions back into the playing state.

With respect to a typical Playback operation, the media element 432 causes GetSampleAsync (Video) to be raised, whereby the CustomMediaStreamSource 540 gathers the sample and returns it via ReportGetSampleCompleted (videoSample). The system repeats this process for each type of sample: audio and/or video.

The contract between the media element 432 and a CustomMediaStreamSource 540 depends on the set of MediaStreamDescriptions that the MediaStreamSource initially passes to the media element 432. Communication from the media element 432 to the CustomMediaStreamSource 540 and from the CustomMediaStreamSource 540 to the media element 432 corresponds to this set of MediaStreamDescriptions. In other words, there is a constraint for each MediaStreamDescription that the media element 432 may pass to the CustomMediaStreamSource 540, namely that it equals at least one of the MediaStreamDescriptions that the CustomMediaStreamSource 540 contains. In the opposite direction, the CustomMediaStreamSource 540 may know of more extra streams than it tells the media element 432, but it does not ask the media element 432 about any of those extra streams. One way to avoid such contractual issues is for the CustomMediaStreamSource 540 to hold onto the same collection of descriptions passed during the call to ReportMediaCompleted for its lifetime.

Figure 7:
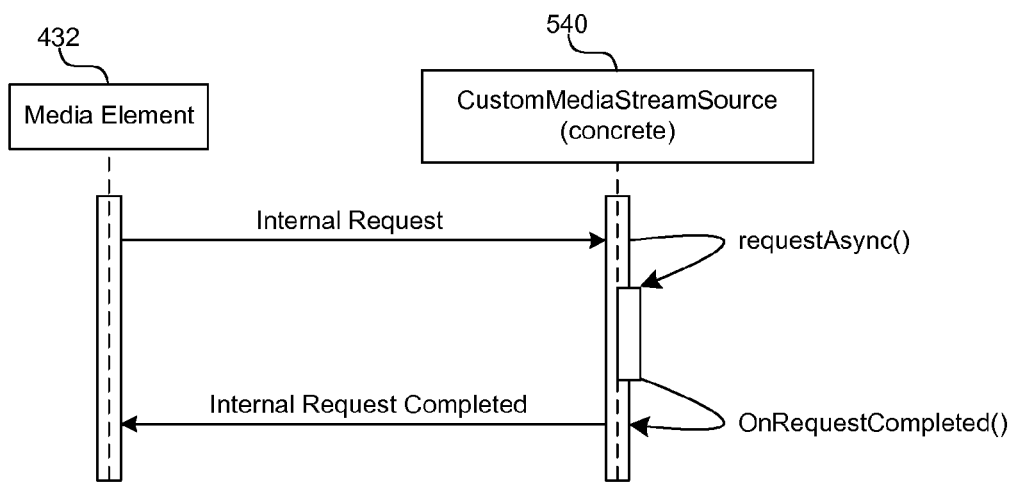
FIG. 7 is a data flow diagram that illustrates subclassing of a MediaStreamSource to handle custom container formats, in one embodiment.

FIG. 7 is a data flow diagram that illustrates subclassing of a MediaStreamSource to handle custom container formats, in one embodiment. Developers can subclass a MediaStreamSource to handle the developer's own container format. Most of the MediaStreamSource API work in pairs and follow the calling pattern represented in FIG. 7. That is, when the media element 432 is ready for information, it makes a request to an internal method on the CustomMediaStreamSource 540. The CustomMediaStreamSource internal method calls directly to the protected "Async" method; the CustomMediaStreamSource 540 does some processing, and the CustomMediaStreamSource 540 calls the protected "Completed" method to signal that it has the requested information. The "Completed" method calls an internal method on the media element 432 to signal it has the information and to pass that information back to the media element 432.

Note that even though the method names are "Async", the code may respond synchronously with the corresponding "Completed" call from within the "Async" method; the "Async" naming is more of a hint about how the media element 432 calls this method. Further, in one example implementation, MediaStreamSource subclasses can only call "Completed" methods in response to matching "Async" methods calls; an exception to this is GetSampleAsync and ReportGetSampleCompleted. In this case, the CustomMediaStreamSource 540 may be buffering and may respond with one or more ReportGetSampleProgress calls followed by a ReportGetSampleCompleted call. In this example, if a "Completed" method is called by a CustomMediaStreamSource 540 without the media element 432 first calling the matching "Async" method, an InvalidOperationException is raised with the message "Only call *Completed in response to a call from "Async". The media element 432 only makes one "Async" call at a time and will wait for the "Completed" response from the CustomMediaStreamSource 540 before issuing another request. An exception to this is CloseAsync, which may be raised after any other Async call if the media element 432 wants to close because of an error or because the media element 432 is being closed.

From the foregoing, it will be appreciated that specific embodiments of the media interaction system have been described herein for purposes of illustration, but that various modifications may be made without deviating from the spirit and scope of the invention. Accordingly, the invention is not limited except as by the appended claims.

We claim:

1. A computer-implemented method for handling extensible media formats in a hosted application platform, the method comprising:
   receiving a hosted application for execution by the hosted application platform, wherein the hosted application interacts with the hosted application platform to playback media, wherein the hosted application platform limits access of the hosted application to a computer system to increase security;
   invoking the received hosted application;
   requesting media from the hosted application, wherein requesting media from the hosted application comprises calling a media retrieving interface implemented by the hosted application;
   receiving uncompressed media from the hosted application, wherein the hosted application is configured to perform decompression of the media from a format in which the hosted application receives the media to the uncompressed media and wherein the hosted application platform provides the hosted application with sufficient access to the computer system to decompress the media to allow the hosted application to support new media formats without updating the hosted application platform but does not provide the hosted application with direct access to the computer system, wherein the hosted application receives the media in a format not understood by the hosted application platform and decompresses the media using a codec provided by the hosted application to convert the media to a format that the hosted application platform can playback; and
   sending the uncompressed media through a media playback pipeline for playback using available hardware within the control of the hosted application platform,
   wherein the preceding steps are performed by at least one processor.

2. The method of claim 1 wherein requesting media from the hosted application comprises periodically calling a media retrieving interface implemented by the hosted application.

3. The method of claim 1 wherein requesting media from the hosted application comprises providing a platform function that the hosted application calls to provide media to the hosted application platform.

4. The method of claim 1 wherein receiving uncompressed media comprises receiving media in a decoded format that the hosted application platform can playback without further decoding of the media format.

5. The method of claim 1 wherein the media pipeline invokes an operating system API (application programming interface) to playback audio samples using speakers and render video frames to a display.

6. The method of claim 1 wherein the received uncompressed media comprises a format of either YV12, RGBA (red green blue alpha), and PCM (pulse code modulation).

7. A computer system for communicating between an application and hosting platform that executes the application to playback or capture media in one or more compressed formats, the system comprising:
   a processor and memory configured to execute software instructions;
   an invoke application component that when executing loads and invokes application code within the hosting platform;
   an execution sandbox component that when executing provides an execution environment for application code that limits the actions that the application can perform to a secure set of actions that are not harmful to the computer system, wherein the actions include decompressing a new media format without accessing the computer system outside of the execution environment;
   a raw media interface component that when executing provides an Application Programming Interface (API) through which the application can provide the hosting platform with raw, uncompressed media content for the platform to playback without providing the application with direct access to the computer system;
   a media playback component that when executing renders media based on the received uncompressed media content under control of the hosting platform; and
   a hardware interface component that when operating interacts with computer hardware and receives data from the media playback component to playback on the computer hardware, wherein the application accesses the computer hardware indirectly through the hosting platform, wherein the invoke application component downloads the application from a network server along with at least one application-referenced codec for handling media data in a given format.

8. The system of claim 7 wherein the invoke application component is further configured to receive a reference to the application from a web page and launch the application based on the reference.

9. The system of claim 7 wherein the execution sandbox component is further configured to receive uncompiled application code of the application and to Just In Time (JIT) compile the application code for execution within the execution environment.

10. The system of claim 7 wherein the execution sandbox component is further configured to provide one or more registered codecs that the application can invoke to decompress media data, wherein the registered codecs can be updated without updating the hosting platform to add support for media types.

11. The system of claim 7 wherein the application receives compressed media content, decompresses the compressed media content within the application, and then provides the raw media interface component with uncompressed media content for playback.

12. The system of claim 7 wherein the raw media interface component receives uncompressed media content from the application and wherein the application synthesizes media content internally.

13. The system of claim 7 wherein the raw media interface component receives uncompressed media content from the application and wherein the application post-processes media content to modify the media content and provides the modified media content as uncompressed media content to the hosting platform.

\* \* \* \* \*